July 16, 1935.    K. W. MAUSER    2,008,079
BUNG CLOSURE FOR METAL VESSELS
Filed March 10, 1932

K. W. Mauser
INVENTOR

By: Marks & Clerk
Attys.

Patented July 16, 1935

2,008,079

UNITED STATES PATENT OFFICE 2,008,079

BUNG CLOSURE FOR METAL VESSELS

Karl Wilhelm Mauser, Cologne-Marienburg, Germany

Application March 10, 1932, Serial No. 598,021
In Germany July 14, 1931

5 Claims. (Cl. 220—39)

Bung closures for metal vessels, for instance iron barrels, must satisfy the following requirements, viz. that the manufacture of the bung bushing and its attachment to the shell of the vessel shall not be costly; that the tight joint between the bung and the bushing shall be on the vessel shell and made without employing any further sealing means; that the bung bushing shall not turn and shall be mounted in such a manner in the flange embossed out of the vessel shell that the closure can be secured against being inadvertently opened by a beaded-over cap.

Individually these requirements are more or less satisfactorily fulfilled in the bung closures hitherto known, but collectively only by the present invention. The invention consists in the combination partly of known individual features and partly of new features and more particularly in this, that a bung bushing is employed which is made either integral with the polygon for preventing the bushing turning or of two parts produced by drawing and stamping from a band-shaped material; that, furthermore, the bung bushing is connected by folding or beading with the flange of the vessel shell, which overlaps it from the outside and that the base of the supporting flange has an abutment which is either made as a separate part or is formed by the union with the bung bushing and serves for the attachment of a securing cap which is to be beaded over.

In the accompanying drawing two constructional examples of the invention are illustrated.

Figure 1:
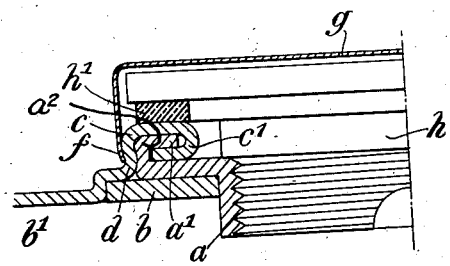
Figure 2:
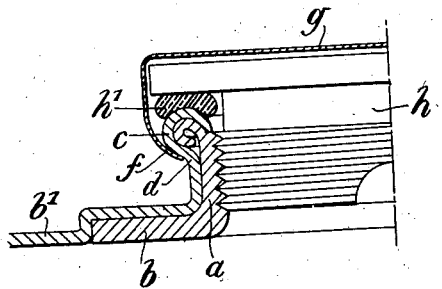

Fig. 1 is a central vertical section of the left-hand half of one constructional form of the bung closure and Fig. 2 is a central vertical section of the left-hand half of a modification.

Fig. 1 shows a bung bushing consisting of two parts, of which $a$ is the threaded part and $b$ the polygonal part which is connected to the bushing $a$ by electric spot welding and prevents the bushing from turning. The bushing $a$, $b$ is connected to the vessel shell $b'$ by an overlapping part $c$ which merges into a folded-over ring $c'$, to which a folded-over ring $a'$ having an external beading $a^2$ on the threaded part $a$ corresponds. The overlapping part $e$ acts as the tight-jointing surface. $h'$ is the tight-jointing for the bung $h$. $d$ is an abutment at the foot of the overlapping part $c$ for the engagement of the beaded-over rim $f$ of the securing cap $g$.

According to Fig. 2 the threaded part $a$ of the bung bushing and the polygonal part $b$ for preventing it from turning are integral with one another. The head of the bung bushing is substantially circular and projects outwards over the threaded part of the bushing so as to form an external beading to obtain a good connection by beading and thereby a secure hold in the overlapping part $c$.

Although the term "polygonal" is used in the specification and claims it is to be understood that applicant does not limit himself to the strict meaning of that term, but that it may be construed to cover any "non-circular" formation.

What I claim is:

1. A bung closure for meter vessels, comprising a bung bushing adapted to receive a cover cap and having an external beading at its outer end and a polygonal flange below said beading in combination with a bushing support embossed outwardly from the wall of the vessel, said bushing support being folded over said polygonal flange for preventing the bung bushing from rotating and having its edge folded over the external beading at the outer end of said bushing so as to hold the bushing in position and seal the bung bushing, said external beading and the metal of the bushing support folded over it forming an abutment over which the edge of the cover can be beaded for securing the cap in position.

2. A bung closure for metal vessels, comprising a bung bushing adapted to receive a cover cap and having its outer end folded to form an overlapping part of substantially circular shape forming an external beading, said bushing having a polygonal flange below said beading in combination with a bushing support embossed outwardly from the wall of the vessel, said bushing support being folded over said polygonal flange for preventing the bung bushing from rotating and having its edge folded over the external beading at the outer end of said bushing so as to hold the bushing in position and seal the bung bushing, said external beading and the metal of the bushing support folded over it forming an abutment over which the edge of the cover cap can be beaded for securing the cap in position.

3. A bung closure for metal vessels comprising a bung bushing adapted to receive a cover cap and having an external beading at the end directed to the exterior of the vessel and having a polygonal flange inwardly of said beading, said bushing being internally threaded, a bushing support embossed outwardly from the wall of the vessel and being folded over said polygonal flange to prevent turning of the bung bushing, the edge of the bushing support being folded over the external beading of the outer end of the bushing to hold and seal the latter, the folded edge of the support overlying said external beading forming an abutment for the flange of a cover threaded in said bushing.

4. A bung closure for metal vessels, comprising a bung bushing adapted to receive a cover cap and comprising a body portion with an external beading at its outer end and a separately formed polygonal flange rigidly secured to said body portion below said beading in combination with a bushing support embossed outwardly from the wall of the vessel, said bushing support being folded over said polygonal flange for preventing the bung bushing from rotating and having its edge folded over the external beading at the outer end of said bushing so as to hold the bushing in position and seal the bung bushing, said external beading and the metal of the bushing support folded over it forming an abutment over which the edge of the cover cap can be beaded for securing the cap in position.

5. A bung closure for metal vessels, comprising a bung bushing adapted to receive a cover cap and having its outer end folded to form an overlapping part of flat elliptical shape having an external beading, said bushing having a polygonal flange below said beading in combination with a bushing support embossed outwardly from the wall of the vessel, said bushing support being folded over said polygonal flange for preventing the bung bushing from rotating and having its edge folded over the external beading at the outer end of said bushing so as to hold the bushing in position and seal the bung bushing, said external beading and the metal of the bushing support folded over it forming an abutment over which the edge of the cover cap can be beaded for securing the cap in position.

KARL WILHELM MAUSER.